United States Patent [19]
Edwards et al.

[11] Patent Number: 6,094,971
[45] Date of Patent: Aug. 1, 2000

[54] SCANNING-PROBE MICROSCOPE INCLUDING NON-OPTICAL MEANS FOR DETECTING NORMAL TIP-SAMPLE INTERACTIONS

[75] Inventors: Hal Edwards, Garland; Walter Duncan, Dallas, both of Tex.

[73] Assignee: Texas Instruments Incorporated, Dallas, Tex.

[21] Appl. No.: 08/936,210

[22] Filed: Sep. 24, 1997

Related U.S. Application Data

[60] Provisional application No. 60/026,651, Sep. 24, 1996.

[51] Int. Cl.$^7$ ...................................................... G01B 7/34
[52] U.S. Cl. .............................................................. 73/105
[58] Field of Search ................................ 73/105; 250/306

[56] References Cited

U.S. PATENT DOCUMENTS

| | | | |
|---|---|---|---|
| 5,212,987 | 5/1993 | Dransfeld et al. | 73/105 X |
| 5,214,279 | 5/1993 | Hakamata | 250/234 |
| 5,641,896 | 6/1997 | Karrai | 73/105 |

OTHER PUBLICATIONS

Edwards, H. et al., "Fast, High–Resolution Atomic Force Microscopy Using a Quartz Tuning Fork as Actuator and Sensor", J. Appl. Phys., vol. 82, No. 03, Aug. 1, 1997, pp. 980–984.

Karrai, K. et al, "Piezoelectric Tip–Sample Distance Control for Near Field Optical Microscopes", Appl. Phys. Lett., vol. 66, No. 14, Apr. 3, 1995, pp. 1842–1844.

*Primary Examiner*—Daniel S. Larkin
*Attorney, Agent, or Firm*—Mark A. Valetti; Carlton H. Hoel; Richard L. Donaldson

[57] ABSTRACT

An embodiment of the instant invention is a scanning-probe microscope for measuring the topography of a surface of a sample, the scanning-probe microscope comprising: an XYZ piezo drive (piezo drive 1); a quartz tuning-fork oscillator (fork 2) having a first electrode (electrode 3 or 4) and a second electrode (electrode 3 or 4), wherein the quartz tuning-fork oscillator is attached to the XYZ piezo drive, and wherein the quartz tuning-fork oscillator is oriented such that the tines of the quartz tuning-fork oscillator each lie in the XY plane and their fundamental mode of oscillation vibrates the ends of the tines in the Z direction; a probe tip (probe tip 6) affixed to one of the tines, the probe tip comes to a point in the Z direction and directed away from the XYZ piezo drive; a signal source (source 7) to provide a drive signal to drive the first electrode at a mechanical resonant frequency of the quartz tuning-fork oscillator; a current-to-voltage amplifier (preamp 8) to monitor the electrical current flowing through the second electrode and having an output, wherein the electrical impedance of the quartz tuning-fork oscillator may be measured, and the resonant vibration amplitude of the quartz tuning-fork oscillator is monitored; and wherein the XYZ piezo drive is operable to move the probe tip close to the surface of the sample until the probe tip lightly taps the sample surface thereby decreasing and oscillation amplitude the electrical impedance of the quartz tuning-fork oscillator and wherein the interaction between the probe tip and the sample surface can be used to regulate the distance between the probe tip and the sample surface.

17 Claims, 2 Drawing Sheets

SCANNING-PROBE MICROSCOPE INCLUDING NON-OPTICAL MEANS FOR DETECTING NORMAL TIP-SAMPLE INTERACTIONS

This application claims priority under 35 USC §119(e)(1) of provisional application number 60/026,651, filed Sep. 24, 1996.

FIELD OF INVENTION

This invention relates generally to Scanning Probe Microscopes (SPM) and the means for measuring the interaction between the SPM tip and the sample surface under study.

BACKGROUND OF THE INVENTION

In semiconductor device characterization and failure analysis, the mapping of surface topography as well as electrical, optical, and magnetic properties on a submicron scale is increasingly important. As the critical device dimensions shrink to the 0.1 micron level, traditional characterization and failure-analysis methods reach resolution limits. The new methods based upon Scanning-Probe Microscopy (SPM), which can in some cases obtain atomic-scale lateral resolution, are thus becoming more attractive.

SPM comprises a family of microscope designs which share three features. An SPM includes a sharp probe tip which monitors a property of the sample surface lying in the XY plane. An SPM further includes an XYZ piezo drive which can scan the probe tip in the XY plane to image the sample surface, as well as move the probe in the Z direction to allow tracking of the sample surface. The final and perhaps most crucial feature of an SPM is a means for monitoring the tip-sample interaction. Thus, by using control electronics to servo such that the tip-sample interaction is held constant and by scanning the probe tip across the sample in the XY plane, the sample topography and other material properties may be simultaneously mapped on a nanometer scale.

The first SPM was the Scanning Tunneling Microscope (STM), in which the probe tip comprised a sharpened piece of wire and the tip-sample interaction was monitored by measuring the electron tunneling current between the tip and a metallic sample surface. This instrument can obtain atomic-scale maps of the sample surface and has revolutionized surface science but is of limited use for characterization and failure analysis of semiconductor devices due to its requirement of a pristine metallic surface everywhere on the sample; an STM cannot image samples which contain insulating portions.

Hence, it is an object of the present invention to image conducting and non-conducting surfaces.

The Atomic-Force Microscope (AFM) alleviated this constraint by monitoring the force between the probe tip and the sample surface. Other than Atomic-scale surface-science applications, most modern SPM instruments are based upon the AFM. For an AFM, the probe tip is micromachined from Si or $Si_3N_4$ and mounted to a miniature cantilever roughly 100–200 microns in length. The deflections and vibrations of this cantilever are monitored by the deflection of a laser beam reflected from the back of the cantilever. Unfortunately, this light illuminates the sample due to the cantilever's partial transparency as well as multiple reflections in the optical system. If the object is to perform electrical measurements on semiconductors, this illumination will cause inaccuracy due to optical carrier generation. Furthermore, for topographic measurements of transparent samples, this illumination can cause laser-induced imaging artifacts.

Hence, it is an object of the present invention to eliminate the laser from the SPM by using a non-optical means for sensing the tip-sample interaction, thus allowing the accurate measurement of electrical properties on light-sensitive materials such as semiconductors and the artifact-free imaging of transparent samples.

Several non-optical means for sensing tip-sample interactions have been proposed. See J. W. P. Hsu, Mark Lee, and B. S. Deaver, REV. SCI. INST. 66 (5), (May 1995)(proposed using a miniature piezoelectric tube, similar to but smaller than that in the XYZ piezo scanner, as an actuator and a sensor of tip oscillations). The piezoelectric tube was driven electrically at one of its mechanical resonances and its electrical impedance was monitored to detect energy dissipation, and hence oscillation-amplitude reductions, due to tip-sample interactions. Unfortunately, even a miniature piezo tube is bulky compared to the nanoscale tip-sample interactions, so the sensitivity of the technique is quite low. Furthermore, the impedance change due to the tip-sample interaction is only a tiny fraction of the total impedance, thus requiring a bridge nulling method of measurement which is very unstable under thermal drift and noise. In addition, materials comprising piezo tubes such as PZT have a low material Q, which results from high intrinsic energy dissipation in the material; this reduces the sensitivity of the detector, which detects energy dissipation in the tip-sample interactions.

Hence, it is an object of the present invention to provide a means of sensing SPM tip-sample interaction which is sensitive enough to detect nanoscale tip-sample interactions. It is a further object of the present invention to provide a means of sensing the SPM tip-sample interaction which does not require nulling methods in its detection and is hence immune from drift. It is a further object of the present invention to provide a means of sensing the tip-sample interaction which employs high-Q materials for all resonant structures.

Another approach to sensing the tip-sample interaction is to use a quartz crystal oscillator, as was suggested by Wolfgang D. Pohl in U.S. Pat. No. 4,851,671. The advantage quartz holds over other piezoelectric materials is its low intrinsic mechanical dissipation, resulting in a potentially high quality factor Q when used properly as an oscillator. Unfortunately, Pohl's sensor used a high-frequency (MHz range), bulk quartz crystal as shown in FIG. 1a. A quartz bulk-crystal oscillator 21 with electrodes 22 and 23 is attached to an XYZ piezo drive 20. A probe tip 24 is mounted to electrode 23. A quartz crystal oscillator of this geometry has a mechanical resonant frequency in the MHz range, and its vibration can be either in the thickness mode or the shear mode. Thus, depending on the quartz polarization, Pohl's microscope will oscillate probe tip 24 either perpendicularly or parallel to a sample surface 25. Because the resonant frequency of quartz bulk-crystal oscillator 21 lies in the MHz range (rather than the kHz range as in the cantilevers of traditional SPM), it is not sensitive to the nanoscale dissipation of tip-sample interactions. Furthermore, the bulk nature of quartz bulk-crystal oscillator 21 introduces a strong coupling between its resonant oscillations and its mounting to XYZ piezo drive 20. Thus, the Q of the oscillator is limited by the high material dissipation of the mounting means rather than the low material dissipation of quartz, further limiting the sensitivity of the tip-sample interaction detection.

Hence, it is a further object of the present invention to provide a means of sensing SPM tip-sample interaction which is immune from dissipative interactions with the mounting means to attach it to the XYZ piezo drive, which would mask the nanoscale dissipation of the tip-sample interactions.

A variant of Pohl's technique uses a quartz tuning-fork oscillator rather than a bulk quartz crystal, thus eliminating the coupling between the resonant vibrations of the quartz oscillator and the mounting means. This is because the tines of a tuning fork vibrate in opposition, and the base of the tuning fork is at a node of oscillation. Because the tuning fork does not cause motion in its base and hence its mounting means, energy is not dissipated in the base or the mounting means, and hence the Q of a quartz oscillator constructed as a tuning fork is limited only by the small material dissipation of quartz, hence Q can assume higher values for a quartz tuning-fork oscillator than for a quartz bulk-crystal oscillator. Klaus Dransfeld, et al., U.S. Pat. No. 5,212,987, discloses an Acoustic Screen Scan Microscope (ASSM) employing the acoustic interaction between a quartz tuning-fork oscillator and the sample surface to detect the tip-sample interactions. In this case, the tip was a corner of one tine of the quartz tuning-fork oscillator. However, the ASSM does not function as an SPM due to the long range of the acoustic interaction of a tip and a sample.

Hence, it is an object of the present invention to provide a means of sensing the tip-sample interaction which is local enough to allow high-resolution, nm-scale imaging.

Recently, Khaled Karrai (patent GB 2,289759 B) has used a quartz tuning-fork oscillator for sensing tip-sample interactions in a Scanning Near-Field Optical Microscopy (NSOM), as shown in FIG. 1b. The reference by Karrai teaches a structure in which the tines of a quartz tuning-fork oscillator 30 are perpendicular to a sample surface 33, hence the probe tip 31 (in Karrai's case a tapered optical fiber) oscillates in a direction along the sample surface. The base of the quartz tuning-fork oscillator 30 is mounted to an XYZ piezo drive 32. Unfortunately, "shearing" the probe tip along the surface is far more damaging to both tip and sample than lightly "tapping" the tip normally on the sample surface. For previous NSOM designs, this is not so critical, since the diameter of tapered optical fiber probes is of the order of 100 nm. However, the technology of Karrai is not appropriate for high-spatial-resolution imaging that other SPM techniques require. For instance, routine AFM analysis can obtain sub-10 nm spatial resolution and some atomic-resolution (i.e., sub-nanometer) work has been done using AFM. Attaining these high-resolution images would be impossible if the tip were sheared across the surface.

It is an object of the present invention to provide a means of sensing the tip-sample interaction which does not damage the tip or the sample by shearing the tip across the sample surface.

SUMMARY OF THE PRESENT INVENTION

One embodiment of the instant invention is an apparatus for sensing the tip-sample interaction in a Scanning-Probe Microscope (SPM). In a preferred embodiment, a quartz tuning-fork oscillator is mounted to an XYZ piezo drive so that its tines lie in the imaging (XY) plane. A metal tip is mounted to the end of one tine of the quartz tuning-fork oscillator, such that its sharpened end points in the Z direction toward the sample under study. The quartz tuning-fork oscillator is driven electrically at its resonant frequency so that its tines oscillate in the Z direction, causing the tip to oscillate in the Z direction. The oscillation amplitude of the quartz tuning-fork oscillator is measured by monitoring its electrical impedance. The XYZ drive moves the tuning fork/tip combination in the Z direction toward the sample until the tip lightly taps the sample surface, decreasing the oscillation amplitude of the tuning fork and hence increasing its electrical impedance, allowing tip-sample distance regulation.

More particularly, this invention relates to a means of measuring the interaction between a microscopic tip and the sample surface in which it is not necessary to use a laser to detect the deflections of a cantilever, as in traditional SPM. Furthermore, this invention relates to a mode of operation in which the SPM tip lightly taps the sample as it is scanned, rather than being sheared across the sample surface, allowing imaging without damaging the tip or the sample, thus improving the spatial resolution, tip lifetime, and repeatability of the SPM imaging.

An embodiment of the instant invention is a scanning-probe microscope for measuring the topography of a surface of a sample, the scanning-probe microscope comprising: an XYZ piezo drive; a quartz tuning-fork oscillator having a first electrode and a second electrode, wherein the quartz tuning-fork oscillator is attached to the XYZ piezo drive, and wherein the quartz tuning-fork oscillator is oriented such that the tines of the quartz tuning-fork oscillator each lie in the XY plane and their fundamental mode of oscillation vibrates the ends of the tines in the Z direction; a probe tip affixed to one of the tines, the probe tip comes to a point in the Z direction and directed away from the XYZ piezo drive; a signal source to provide a drive signal to drive the first electrode at a mechanical resonant frequency of the quartz tuning-fork oscillator; a current-to-voltage amplifier to monitor the electrical current flowing through the second electrode and having an output, wherein the electrical impedance of the quartz tuning-fork oscillator may be measured, and the resonant vibration amplitude of the quartz tuning-fork oscillator is monitored; and wherein the XYZ piezo drive is operable to move the probe tip close to the surface of the sample until the probe tip lightly taps the sample surface thereby decreasing and oscillation amplitude the electrical impedance of the quartz tuning-fork oscillator and wherein the interaction between the probe tip and the sample surface can be used to regulate the distance between the probe tip and the sample surface. Preferably, the probe tip is comprised of a wire which is comprised of a material selected from the group consisting of: W, Pt, Ir, Pt/Ir alloys, Au, Ag, Al, Al/Si alloys, Al/Mg alloys, Nb, and Ti. The wire comprising the probe tip is, preferably, either electrically connected to either the first electrode or the second electrode and the electrical potential of the probe tip is controlled, or the wire is electrically isolated from the first and second electrodes and is electrically connected to an external device. If the wire is connected to an external device, the external device is, preferably: a capacitance sensor thereby allowing the mapping of the capacitance between the probe tip and the sample surface; or a bias voltage source thereby allowing the potential of the probe tip to be controlled independently of the first and second electrodes. The external device may be operable to measure the electrical potential difference between the probe tip and the sample surface, and electrostatic properties of the sample surface is mapped in order to perform scanning Kelvin-probe microscopy. The external device may include a sensitive current electrometer to measure the tunneling current between the probe tip and the sample surface so as to perform scanning-tunneling microscopy and scanning-tunneling spectroscopy.

In an alternative embodiment, the probe tip is further comprised of a magnetic material such that the resonant frequency of the quartz tuning-fork oscillator is shifted, the frequency shift detected by the phase-locked loop. Preferably, the magnetic field structure of the sample surface is mapped in order to perform magnetic-force microscopy.

In another alternate embodiment, the probe tip is coated with a thin film of a magnetic material such that a magnetic field exerts a force on the probe tip thereby shifting the resonant frequency of the quartz tuning-fork oscillator, the frequency shift being detected by the phase-locked loop. Preferably, the magnetic field structure of the sample surface is mapped in order to perform magnetic-force microscopy.

In another embodiment, the scanning-probe microscope of the instant invention may further include a phase-sensitive detector to monitor the electrical phase difference between the drive signal and the output of the current-to-voltage amplifier, whereby the interaction between the probe tip and the sample surface is monitored by measuring the phase difference between the drive signal and the electro-mechanical response of the quartz tuning-fork oscillator. Preferably, the signal source comprises a voltage-controlled oscillator, and wherein the output of the phase-sensitive detector is an input to the voltage-controlled oscillator thereby forming a phase-locked loop wherein the interaction between the probe tip and the sample surface is monitored as a shift in the mechanical resonant frequency of the quartz tuning-fork oscillator.

Preferably, the probe tip is comprised of a metal selected from the member of the group consisting of: Al, Ti, Nb, alloys of Al, alloys of Ti, alloys of Nb, and any other metal with a stable oxide. The probe tip may be electrically isolated from the sample surface.

Another embodiment of the instant invention is a near-field scanning optical microscope for mapping the topography and optical properties of a sample surface, the near-field scanning optical microscope comprising: a XYZ piezo drive; a quartz tuning-fork oscillator having a first electrode and a second electrode, the quartz tuning-fork oscillator is attached to the XYZ piezo drive and is oriented such that tines of the quartz tuning-fork oscillator each lie in the XY plane and their fundamental mode of oscillation vibrates the ends of the tines in the Z direction; an optical fiber affixed to one of the tines, the optical fiber comes to a point in the Z direction and directed away from the XYZ piezo drive; a signal source to drive the first electrode at a mechanical resonant frequency of the quartz tuning-fork oscillator; a current-to-voltage amplifier to monitor the electrical current flowing through the second electrode, the electrical impedance of the quartz tuning-fork oscillator is measured and the resonant vibration amplitude of the quartz tuning-fork oscillator is monitored; and wherein the XYZ piezo drive moves the optical fiber close to a sample surface until the optical fiber lightly taps the sample surface so as to decrease, the oscillation amplitude and the electrical impedance of the quartz tuning-fork oscillator, the interaction between the optical fiber and the sample surface is utilized so as to regulate the distance between optical fiber and sample surface.

BRIEF DESCRIPTION OF THE DRAWINGS

FIGS. 3a–3c illustrate different ways of attaching the probe tip of the instant invention to the tuning-fork of the instant invention.

DETAILED DESCRIPTION OF THE DRAWINGS

To accomplish the above objects, the embodiments of the instant invention include an SPM employing a non-optical means to sense the tip-sample interactions, thereby allowing nanometer-resolution imaging of conducting, insulating, opaque, and transparent samples without introducing unwanted illumination to the sample surface, without degrading the imaging resolution by tip-sample damage, without susceptibility to drift, and without introducing imaging artifacts. Below is described a preferred embodiment but one of ordinary skill in the art will realize that there are other possible extensions of the present invention, as described in the appended claims.

Figure 2A:
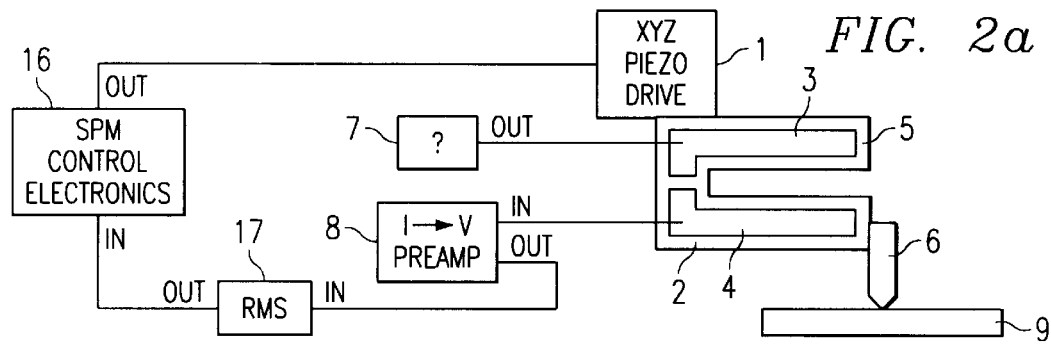
FIGS. 2a–2c are block diagrams illustrating three different embodiments of the instant invention.

In a preferred embodiment, as shown in FIG. 2a, an XYZ piezo drive 1 connected to the output of SPM control electronics 16 is attached a quartz tuning-fork oscillator 2, on one of whose two tines 5 is mounted a probe tip 6 (preferably comprised of a piece of wire or optical wire which comes to a point). The tines 5 are disposed parallel to the surface 9 of a sample under study and the quartz tuning-fork oscillator 2 is oriented such that when it vibrates resonantly, its tines 5 oscillate in the Z direction, that is, perpendicularly to the sample surface 9. In commercially-available quartz tuning-fork oscillators, electrodes 3 and 4 are present on the quartz surface.

By applying an AC potential difference between electrodes 3 and 4, using an AC signal source 7, the tines 5 of the quartz tuning-fork oscillator 2 are set into motion due to the piezoelectric properties of quartz. This motion is greatest when the frequency of the AC signal source 7 matches a mechanical resonant frequency of the quartz tuning-fork oscillator 2.

By using a current-to-voltage preamplifier 8 to monitor the AC electric current which flows through electrode 4, the electrical impedance of the quartz tuning-fork oscillator may be estimated by dividing the amplitude of the AC voltage source 7 by the amplitude of the AC current measured from electrode 4. The output of preamp 8 is connected to the input of RMS circuit 17, whose output is connected to the input of SPM control electronics 16. On resonance, this impedance is typically about 30 kOhms, whereas off resonance, the impedance is limited by the roughly 1 pF of shunt capacitance between electrodes 3 and 4. At 32 kHz, the typical resonant frequency of a quartz tuning-fork oscillator, the displacement current due to the shunt capacitance is thus about an order of magnitude less than the current due to the resonant vibrations of the quartz tuning-fork oscillator. This electrical impedance increases as the dissipative tip-sample interaction increases, and thus can be used to monitor the tip-sample interaction. This monitoring may be used in a feedback loop to regulate the tip-sample distance and hence allow SPM imaging of the sample surface 9. The oscillation amplitude of the probe tip 6 is reduced significantly when the XYZ drive 1 brings the probe tip 6 near enough to the sample surface 9 that the probe tip 6 begins to lightly tap the sample surface 9.

Using the present invention, the tip-sample interaction is monitored without using a laser beam, and hence the sample is not illuminated during the measurement. This allows greater accuracy and repeatability in electrical measurements of the sample. For instance, in a Scanning Capacitance Microscope (SCM), a conductive SPM tip is electrically connected to a capacitance sensor, and the tip-sample capacitance is recorded, allowing the mapping of the electrical carrier concentration in semiconductors. However, presently-available SCM instruments use laser-beamdeflection to monitor tip-sample interactions, and the laser light illuminates the sampling volume beneath the tip, modifying the carrier concentration and hence invalidating the measurement. Furthermore, since the laser-beam-deflection system is re-calibrated each time the tip is replaced, its illumination level varies from measurement to measurement and hence the laser-beam-deflection method hurts the reproducibility of SCM measurements.

Furthermore, the quartz tuning-fork oscillator is one of the most sensitive force detectors available. While its tines may be several millimeters in length, and hence macroscopic in size, the low mechanical dissipation of quartz combined with its tuning-fork shape allow a quartz tuning-fork oscillator to attain a mechanical Q of around 50,000. Thus, when a quartz tuning-fork oscillator is set in motion, it will oscillate 50,000 times before its amplitude of oscillation is significantly damped. It has been shown that a quartz tuning-fork oscillator is comparable in force sensitivity to a micromachined Si cantilever such as those used in traditional, laser-beam-deflection SPM instruments. Thus, the present invention is sensitive enough to detect nanoscale tip-sample interactions.

The present invention is not appreciably susceptible to drift in the actuating and sensing electronics. As shown above, the electrical impedance of the quartz tuning-fork oscillator off resonance (due to the pico farad shunt capacitance) is an order of magnitude greater than its on-resonance value, and hence the measured current signal is much greater than the background, obviating the need for bridge-circuit nulling.

Figure 4:
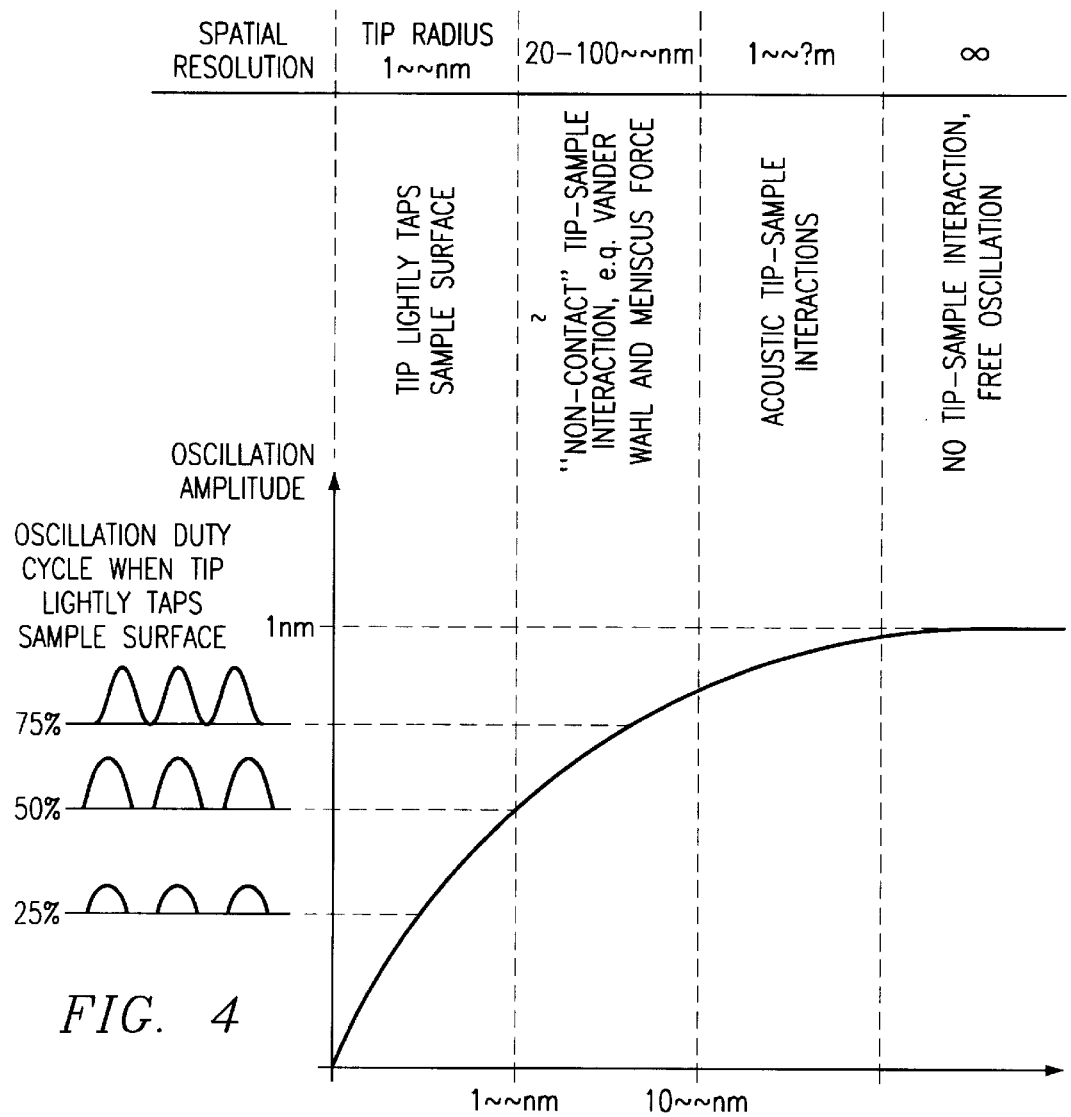
FIG. 4 is a graph illustrating the oscillation amplitude of the tuning fork of the instant invention versus the tip radius.

As the XYZ piezo drive 1 brings the probe tip 6 from a point far away from the sample surface 9 to within a few nanometers of the sample surface 9, short-range, contact interactions begin to dominate the tip-sample interaction, and hence the imaging resolution is improved by orders of magnitude. This is best understood by reference to the schematic in FIG. 4, in which the interaction of probe tip 6 and sample surface 9 is summarized as a function of tip-sample separation.

When the probe tip 6 is microns away from the sample surface 9, the probe tip 6 and the sample surface 9 do not interact appreciably. In this regime, regulation of the probe-sample separation is extremely difficult, preventing SPM imaging.

As the probe tip 6 is brought within a micron of the sample surface 9, a long-range acoustic interaction is detectable as a slight damping in the probe-tip oscillation. In this regime, imaging is possible on the micron scale, since the long-range nature of the interaction is not sensitive to submicron features of the sample surface 9. This is the regime of operation of the ASSM of Dransfeld et al. It is clearly not suitable for nanoscale SPM imaging.

Closing the gap between the probe tip 6 and the sample surface 9 to within tens of nanometers, long-range surface forces begin to affect the tip-sample interaction. Examples of long-range surface forces include van der Waals forces (more accurately, Casimir forces, since van der Waals forces take place between single atoms, whereas Casimir forces are the analogous forces between solids) and meniscus forces due to the adsorbed moisture and contamination layer on any surface in the ambient air. Due to the long-range nature of these forces, the imaging spatial resolution is many tens of nanometers.

As the gap is further reduced to less than 1 nm, the probe tip 6 lightly taps the sample surface 9. In this regime, the oscillation amplitude of the probe tip 6 is truncated as in FIG. 4. The mechanical interaction between the probe tip 6 and the sample surface 9 dominates the imaging, and hence the spatial resolution is limited by the radius of the very end of the probe tip 6, which may be under 1 nm for specially-prepared tips.

If the quartz tuning-fork oscillator 2 is oriented so that its tines 5 vibrated resonantly in a direction parallel to the sample surface 9, the probe tip 6 would be scraped or sheared sideways along the surface. It is well known in SPM that a sideways shearing motion between a probe tip and a sample is damaging to both tip and sample, thus the NSOM design of Karrai is incapable of the high-resolution SPM imaging possible with the present invention. This shortcoming is solved in the present invention because quartz tuning-fork oscillator 2 is mounted such that probe tip 6 vibrates perpendicularly to and lightly taps sample surface 9 rather than shearing along it. Furthermore, the presence of optical fiber 31 glued to the side of a tine of quartz tuning-fork oscillator 30 reduces its Q, and hence its sensitivity to tip-sample interactions, by orders of magnitude. This shortcoming is solved in the present invention because the probe tip 6 is comprised of a tiny piece of wire which can be under 0.001 inch in diameter, and hence does not perturb the oscillations of quartz tuning-fork oscillator 2.

There are several possible modifications to the preferred embodiment. For instance, there are alternative methods to measure the impedance of the quartz tuning-fork oscillator. One is to use the apparatus of FIG. 2a to monitor the vibration amplitude of quartz tuning-fork oscillator 2. However, one can also measure the phase difference between the driving voltage and vibration, or one can use a phase-locked loop to track shifts in the resonant frequency of the quartz tuning-fork oscillator 2.

Figure 2B:
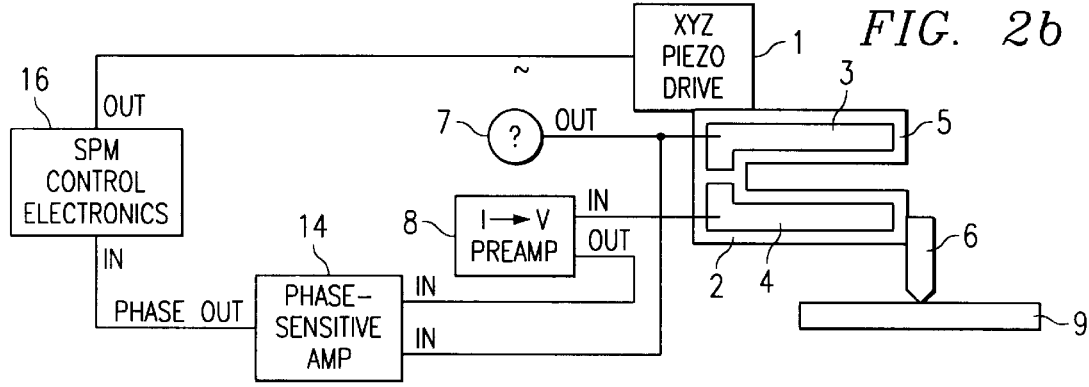

Measuring the phase difference between the AC driving voltage from AC signal source 7 and the vibrations of quartz tuning-fork oscillator 2 can be accomplished by adding a phase-sensitive amplifier 14 as in FIG. 2b. The outputs of AC signal source 7 and current-to-voltage preamplifier 8 are fed into the inputs of phase-sensitive amplifier 14. The output of phase-sensitive amplifier 14 is proportional to the phase difference between the AC drive signal and the electromechanical response of quartz tuning-fork oscillator 2. A phase difference can develop between the driving voltage and the vibrations between quartz tuning-fork oscillator 2 by several mechanisms. A static force on the tip will cause the resonant frequency of quartz tuning-fork oscillator 2 to shift, which causes a phase shift in its response to the driving voltage. Another possible origin of a phase shift is that interactions between the tip and the sample cause a delay or acceleration of the oscillatory response of quartz tuning-fork oscillator 2. In either case, the phase shift is due to tip-sample interactions and hence can be used for regulating tip-sample distance in nm-resolution imaging.

Figure 2C:
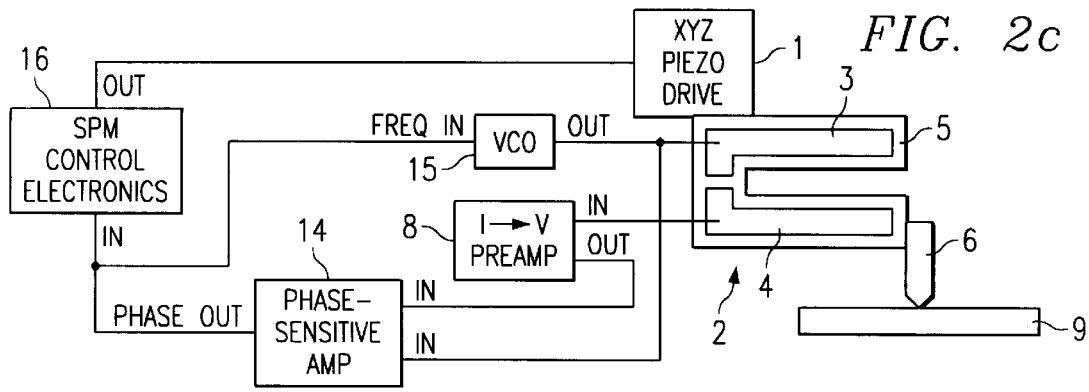

To track the resonant frequency of quartz tuning-fork oscillator 2, an embodiment of the instant invention includes a phase-locked loop as in FIG. 2c. The AC voltage source 7 is further specified as a voltage-controlled oscillator 15, which has the property that the frequency of its AC signal output is controlled by an input voltage. Phase-sensitive amplifier 14 detects the difference in phase between the AC signal applied to electrode 3 and the electromechanical response of quartz tuning-fork oscillator 2, as read through electrode 4 and amplified by current-to-voltage preamplifier 8. This phase difference is reflected as a voltage in the output of the phase-sensitive amplifier 14, which is used as the input for voltage-controlled oscillator 7. In this way, a phase-locked loop is formed such that a constant phase difference is maintained between the AC driving signal and the vibrations of the quartz tuning-fork oscillator 2 as the resonant frequency is tracked. Since a phase-locked loop can respond quickly to small changes in the resonant frequency of the quartz tuning-fork oscillator 2, it provides a fast method of monitoring the tip-sample interaction. The tip-sample interaction is monitored through the output of phase-sensitive detector 14, which is proportional to the frequency shift due to its use as input for the voltage-controlled oscillator 15.

Figure 3A:
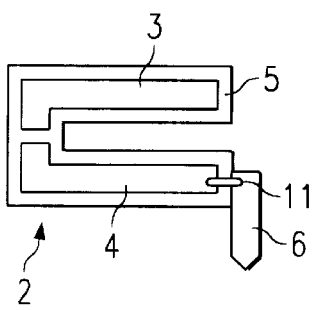
FIGS. 3a–3c illustrate three different embodiments of the instant invention.
Figure 3B:
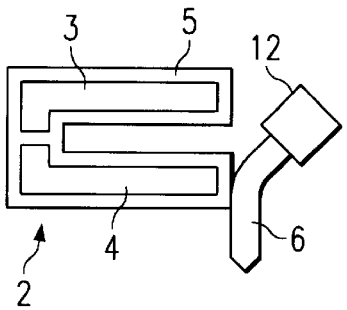
Figure 3C:
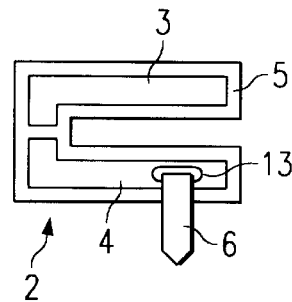

For making electrical measurements with the present invention, it is preferable to control the potential on the probe tip 6. The different ways of doing this are shown in FIGS. 3a, 3b and 3c. In FIG. 3a, an electrically conductive adhesive means such as conductive glue or solder (shown as element 11 in FIG. 3a) is applied between electrode 4 and probe tip 6, thus holding probe tip 6 at the same potential as electrode 4. Since in the preferred embodiment (as shown in FIGS. 2a, 2b and 2c) electrode 4 is connected to the input of current-to-voltage preamplifier 8, which keeps its input at virtual ground, the probe tip 6 is grounded in this configuration. Thus, a relative bias voltage may be applied between probe tip 6 and sample surface 9 by applying a bias voltage to sample surface 9.

If it is desired to control the potential of probe tip 6 independently of electrode 4, the wire comprising probe tip 6 may be extended in the direction opposite to the tip such that electrical connection is made with an external device 12, as shown in FIG. 2b. One example of such an external device is a capacitance sensor as in SCM, so that the capacitance between the probe tip 6 and the sample surface 9 may be monitored without introducing high-frequency signals to electrode 4 or parasitic capacitance to the capacitance sensor. Another example is the situation in which the potential of the sample surface 9 cannot be controlled independently, in which case external device 12 could be a source of bias.

Another way to electrically attach probe tip 6 to electrode 4 is to attach it directly to electrode 4 using a conductive means such as solder or conductive glue, (shown as element 13 in FIG. 3c) as shown in FIG. 3c. This method may be preferable since it allows the mass of material added to the tines 5 to be minimized.

To further elucidate the beneficial nature of the present invention, there are presented several SPM applications which are improved by implementing them using the present invention.

In Magnetic-Force Microscopy (MFM), the SPM probe tip is magnetic, so that a magnetic field in the sample exerts a force on the probe tip, allowing the mapping of the magnetic structure of a sample. MFM is traditionally performed with a micromachined Si cantilever which has been coated with a thin film of a magnetic material. The magnetic force is detected by using a phase-locked loop to track changes in the cantilever resonance frequency. Unfortunately, the spatial resolution in MFM is limited by the cantilever oscillation amplitude—usually tens to hundreds of nanometers. This large amplitude of oscillation causes the magnetic probe tip to spend most of the time far from the sample surface, and hence the magnetic force on the probe tip is due to a laterally wider region than if the probe tip were held close to the sample surface at all times. In the present invention, quartz tuning-fork oscillator 2 has a high spring constant, and hence its amplitude of oscillation can be kept in the sub-nanometer regime. Thus, if the present invention were used as an MFM, its spatial resolution could be better than that possible with present MFM technology. To use the present invention as an MFM, the configuration in FIG. 2c would be used to detect the magnetic force by a change in the resonant frequency of quartz tuning-fork oscillator 2, with the further specification that probe tip 6 comprises a wire of magnetic material such as Fe or a wire which has been coated with a magnetic thin film.

In Scanning Kelvin-Probe Microscopy (SKPM), the electrical potential difference between a conductive probe tip and a sample is mapped along with sample topography, allowing various electrostatic properties of the sample surface to be elucidated. Like MFM, SKPM is performed using a cantilever whose oscillations are large, thus limiting the possible spatial resolution of SKPM to tens or hundreds of nm. Using the present invention, as in FIG. 2a, 2b and 2c, in conjunction with specialized SKPM detection electronics, the tip-sample electrical potential difference may be mapped on a nanometer scale due to the small oscillation amplitude of quartz tuning-fork oscillator 2 and hence the close proximity of probe tip 6 and sample surface 9.

The small oscillation amplitude of probe tip 6 may further be exploited to use the present invention as a combination SPM/STM. If a sensitive electrometer is used to monitor the electric tunneling current between probe tip 6 and sample surface 9, and the AC signal source 7 is chosen to have a small enough amplitude that the oscillations of probe tip 6 are a tenth of a nanometer or less, then the present invention may be used to regulate the tip-sample distance by monitoring tip-sample forces while the sensitive electrometer monitors the tunneling current. This would offer several advantages over present STM technology. For instance, STM could be performed on samples whose surface contain insulating regions, since the tip-sample distance would be regulated by tip-sample force rather than tunneling current. Furthermore, sensitive current detection could be performed since the tunneling-current amplifier would not need to be placed in a feedback loop, and hence a sensitive electrometer could be used. Very stable Scanning Tunneling Spectroscopy could be performed with such an SPM/STM, since the tip-sample distance would be regulated independently of the tunneling current, and hence the bias voltage could be ramped, and the current measured, all under stable tip-sample feedback (presently, such spectroscopy must be performed very quickly, with the feedback loop disabled; longer averaging times would reduce noise). And finally, previously impossible forms of spectroscopy would be enabled by such an SPM/STM, for instance, precise monitoring of how the atomic-scale tip-sample force changes tinder an applied voltage.

Another SPM application which would be improved by the present invention is SCM. At present, SCM is performed in contact mode with a conductive cantilever. Thus, the tip is scraped across the sample, resulting in uncontrollable tip wear, and hence a degradation in the spatial resolution and repeatability. Furthermore, the capacitance signal is detected using AC techniques, namely an AC bias voltage is applied to the sample and dC/dV, the voltage derivative of the tip-sample capacitance, is measured. Unfortunately, this method also picks up stray capacitance which may depend on geometry and other environmental factors, and hence is unrepeatable. Thus, the sensitivity and repeatability of SCM suffers in the present SCM method.

These problems could be alleviated using the present invention. First, with the present invention, the tip lightly taps the sample surface rather than scraping across it, preserving the tip shape and hence the spatial resolution and removing a source of non-repeatability. To detect the capacitance signal, an AC technique would be used to detect the change in capacitance as a function change in the z position, using the oscillation of probe tip 6 instead of an AC bias voltage (as is used to measure the change in capacitance as a function of change in voltage). Furthermore, due to the high spring constant of quartz tuning-fork oscillator 2, the oscillation amplitude of probe tip 6 could be 0.1 nm or less, so that very fine-scale variations in the electronic properties of sample surface 9 could be mapped.

A further advantage of the present invention's use of tip oscillation rather than AC sample bias voltage for the AC detection of capacitance is that the AC bias-voltage amplitudes typically required for SCM are typically around 1 V. Unfortunately, features in C(V) curve are often less than 1 V in width, so that such a high AC bias voltage renders present SCM insensitive to these features. In practice, this provides a further limit to spatial resolution, since the depletion width in the semiconductor is dependent upon the voltage, hence the depletion region beneath sample surface 9 is pushed back and forth by the AC bias voltage, and the measurement averages over a large volume. Using the present invention, there is no AC bias voltage applied to the sample, so this mechanism for spatial-resolution degradation is removed.

Specifically, present SCM systems can only achieve 100 nm spatial resolution, barely adequate for detecting the source and drain implants in state-of-the-art MOS devices, let alone performing metrological measurements of the nanometer-scale profiles of these implants. Since metal tips may be etched down to an end radius of a few nanometer, it is expected that a spatial resolution of a few nm could be obtained in SCM using the present invention.

To form an SCM using the present invention, the wire comprising probe tip 6 is extended to make electrical contact to external electronic device 12 as in FIG. 3b. In this case external device 12 is a capacitance sensor. To perform SCM, there preferably is not direct electrical contact between probe tip 6 and sample surface 9, for the capacitance measurement relies upon the electrical isolation of probe tip 6 (other than capacitive coupling between probe tip 6 and sample surface 9, for instance). One method to accomplish this is to coat sample surface 9 with an insulating layer, for instance a deposited film of $SiO_2$ of under 10 nm in thickness. Unfortunately, this method is not repeatable from sample to sample since the thickness, trapped charge, and other properties of the $SiO_2$ film will vary significantly from sample to sample. One way to alleviate this problem is to use a material such as Al, Nb, Ti, or another metal or alloy which has a robust native oxide for probe tip 6. For instance, the oxide of Al has been used for tunneling barriers as well as the insulator in capacitors, so its insulating properties and uniformity are known to be quite good.

Figure 1A:
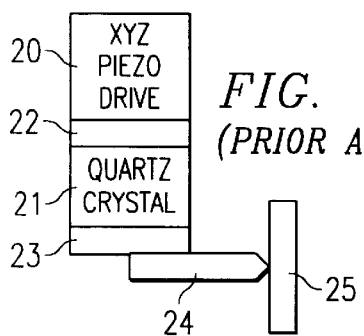
FIGS. 1a and 1b illustrate prior art microscopes.
Figure 1B:
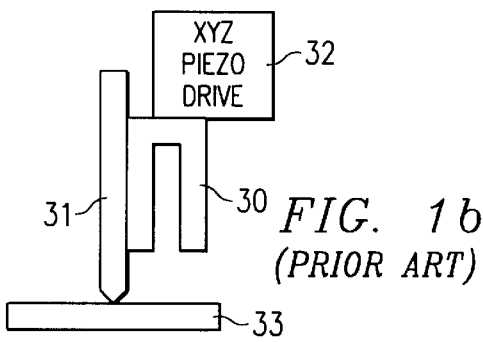

Another application of the present invention is in NSOM. Specifically, instead of mounting the optical fiber along a tine of quartz tuning-fork oscillator 2 as in FIG. 1b, the optical fiber would be mounted as probe tip 6 is in FIG. 2a–2c, perpendicular to the tines 5. Thus, the optical fiber would vibrate perpendicular to sample surface 9, and could be brought near enough to lightly tap sample surface 9, allowing high-resolution imaging without damaging the end of the optical fiber.

As can be seen by these examples, any SPM method which relies upon cantilever oscillation to detect a property of sample surface 9 may be improved in spatial resolution by employing the present invention, due to its high sensitivity at small amplitudes of oscillation.

Another advantage of the present invention over detection using a micromachined Si cantilever is geometrical. If sample surface 9 has significant topography, the cantilever will interact acoustically or mechanically with sample surface 9, thus masking the interaction of the probe tip with sample surface 9. Specifically, the probe tip on a micromachined Si SPM cantilever is usually a pyramid about 10 microns high, so that if sample surface 9 has micron-scale topography, either the cantilever will contact the high points of sample surface 9 or the acoustic interaction between the cantilever and sample surface 9 will mask the tip-sample interaction. This type of instrumental difficulty is well-known to workers in the SPM field.

This problem is further exacerbated in many practical applications, such as when it is desired to lower the probe tip into an integrated-circuit package. In this case, the surface of interest may be recessed by a few mm, and there may be bond wires protruding around the edges of the package. Thus, traditional cantilever-based SPM has difficulty imaging samples with significant packaging or micron-scale topography.

The present invention, however, employs for probe tip 6 a piece of wire which can be several mm in length, thus avoiding interactions between quartz tuning-fork oscillator 2 and micron-scale roughness on sample surface 9 as well as facilitating probing samples recessed in a mounting means. Thus for failure analysis of integrated circuits, the present invention presents compelling advantages over traditional cantilever-based SPM technology.

We claim:

1. A scanning-probe microscope for measuring the topography of a surface of a sample, said scanning-probe microscope comprising:
   an XYZ piezo drive;
   a quartz tuning-fork oscillator having a first electrode and a second electrode, wherein said quartz tuning-fork oscillator is attached to said XYZ piezo drive, and wherein said quartz tuning-fork oscillator is oriented such that the tines of said quartz tuning-fork oscillator each lie in the XY plane and their fundamental mode of oscillation vibrates the ends of said tines in the Z direction;
   a probe tip affixed to one of said tines, said probe tip comes to a point in the Z direction and directed away from said XYZ piezo drive;
   a signal source to provide a drive signal to drive said first electrode at a mechanical resonant frequency of said quartz tuning-fork oscillator;
   a current-to-voltage amplifier to monitor the electrical current flowing through said second electrode and having an output, wherein the electrical impedance of said quartz tuning-fork oscillator may be measured, and the resonant vibration amplitude of said quartz tuning-fork oscillator is monitored; and
   wherein said XYZ piezo drive is operable to move said probe tip close to said surface of said sample until said probe tip lightly taps said sample surface thereby decreasing and oscillation amplitude said electrical impedance of said quartz tuning-fork oscillator and wherein the interaction between said probe tip and said sample surface can be used to regulate the distance between said probe tip and said sample surface.

2. The scanning-probe microscope of claim 1, wherein said probe tip is comprised of a wire which is comprised of a material selected from the group consisting of: W, Pt, Ir, Pt/Ir alloys, Au, Ag, Al, Al/Si alloys, Al/Mg alloys, Nb, and Ti.

3. The scanning-probe microscope of claim 2, wherein said wire comprising said probe tip is electrically connected to either said first electrode or said second electrode and the electrical potential of said probe tip is controlled.

4. The scanning-probe microscope of claim 2, wherein said wire is electrically isolated from said first and second electrodes and is electrically connected to an external device.

5. The scanning-probe microscope of claim 4, wherein said external device is a capacitance sensor thereby allowing the mapping of the capacitance between said probe tip and said sample surface.

6. The scanning-probe microscope of claim 5, wherein said probe tip is comprised of a metal selected from the member of the group consisting of: Al, Ti, Nb, alloys of Al, alloys of Ti, alloys of Nb, and any other metal with a stable oxide.

7. The scanning-probe microscope of claim 6, wherein said probe tip is electrically isolated from said sample surface.

8. The scanning-probe microscope of claim 4, wherein said external device is a bias voltage source thereby allowing the potential of said probe tip to be controlled independently of said first and second electrodes.

9. The scanning-probe microscope of claim 4, wherein said external device measures the electrical potential difference between said probe tip and said sample surface, and electrostatic properties of said sample surface are mapped in order to perform scanning Kelvin-probe microscopy.

10. The scanning-probe microscope of claim 4, wherein said external device includes a sensitive current electrometer to measure the tunneling current between said probe tip and said sample surface so as to perform scanning-tunneling microscopy and scanning-tunneling spectroscopy.

11. The scanning-probe microscope of claim 1, further including a phase-sensitive detector to monitor the electrical phase difference between the drive signal and the output of said current-to-voltage amplifier, whereby the interaction between said probe tip and said sample surface is monitored by measuring the phase difference between the drive signal and the electromechanical response of said quartz tuning-fork oscillator.

12. The scanning-probe microscope of claim 11, wherein said signal source comprises a voltage-controlled oscillator, and wherein the output of said phase-sensitive detector is an input to said voltage-controlled oscillator thereby forming a phase-locked loop wherein the interaction between said probe tip and said sample surface is monitored as a shift in the mechanical resonant frequency of said quartz tuning-fork oscillator.

13. The scanning-probe microscope of claim 12, wherein said probe tip is further comprised of a magnetic material such that the resonant frequency of said quartz tuning-fork oscillator is shifted, said frequency shift detected by said phase-locked loop.

14. The scanning-probe microscope of claim 13, wherein the magnetic field structure of said sample surface is mapped in order to perform magnetic-force microscopy.

15. The scanning-probe microscope of claim 12, wherein said probe tip is coated with a thin film of a magnetic material such that a magnetic field exerts a force on said probe tip thereby shifting the resonant frequency of said quartz tuning-fork oscillator, said frequency shift being detected by said phase-locked loop.

16. The scanning-probe microscope of claim 15, wherein the magnetic field structure of said sample surface is mapped in order to perform magnetic-force microscopy.

17. A near-field scanning optical microscope for mapping the topography and optical properties of a sample surface, said near-field scanning optical microscope comprising:
a XYZ piezo drive;
a quartz tuning-fork oscillator having a first electrode and a second electrode, said quartz tuning-fork oscillator is attached to said XYZ piezo drive and is oriented such that tines of said quartz tuning-fork oscillator each lie in the XY plane and their fundamental mode of oscillation vibrates the ends of said tines in the Z direction;
an optical fiber affixed to one of said tines, said optical fiber comes to a point in the Z direction and directed away from said XYZ piezo drive;
a signal source to drive said first electrode at a mechanical resonant frequency of said quartz tuning-fork oscillator;
a current-to-voltage amplifier to monitor the electrical current flowing through said second electrode, the electrical impedance of said quartz tuning-fork oscillator is measured and the resonant vibration amplitude of said quartz tuning-fork oscillator is monitored; and
wherein said XYZ piezo drive moves said optical fiber close to a sample surface until said optical fiber lightly taps said sample surface so as to decrease, said oscillation amplitude and said electrical impedance of said quartz tuning-fork oscillator, the interaction between said optical fiber and said sample surface is utilized so as to regulate the distance between optical fiber and sample surface.

* * * * *